(12) United States Patent
Stratman

(10) Patent No.: US 7,673,930 B2
(45) Date of Patent: Mar. 9, 2010

(54) RT REINFORCER

(75) Inventor: Randy Stratman, Rochester Hills, MI (US)

(73) Assignee: Sika Technology AG, Baar (CH)

( * ) Notice: Subject to any disclaimer, the term of this patent is extended or adjusted under 35 U.S.C. 154(b) by 473 days.

(21) Appl. No.: 11/644,104

(22) Filed: Dec. 22, 2006

(65) Prior Publication Data

US 2008/0150323 A1 Jun. 26, 2008

(51) Int. Cl.
*B60J 9/00* (2006.01)
(52) U.S. Cl. .............................. 296/187.02; 296/187.01
(58) Field of Classification Search ............ 296/187.01, 296/187.02
See application file for complete search history.

(56) References Cited

U.S. PATENT DOCUMENTS

| 6,619,727 | B1 * | 9/2003 | Barz et al. | 296/187.02 |
| 6,941,719 | B2 * | 9/2005 | Busseuil et al. | 296/187.02 |
| 2004/0046421 | A1 * | 3/2004 | Barz | 296/187.02 |
| 2004/0222665 | A1 * | 11/2004 | Roeth et al. | 296/187.01 |
| 2005/0040671 | A1 * | 2/2005 | Barz | 296/187.02 |
| 2008/0143143 | A1 * | 6/2008 | Brennecke | 296/187.01 |

\* cited by examiner

*Primary Examiner*—Lori L Lyjak
(74) *Attorney, Agent, or Firm*—Rader, Fishman & Grauer, PLLC

(57) ABSTRACT

An improved structural reinforcer is provided, some embodiments comprising expansible material disposed on a carrier, the carrier having a plurality of chambers arranged longitudinally, with locking slots and shutoffs that lock a portion of the expansible material to the carrier, and a channel that permits the flow of liquids within a structural member in which the structural reinforcer is disposed.

34 Claims, 7 Drawing Sheets

RT REINFORCER

FIELD OF THE INVENTION

This invention relates to reinforcers for structural members.

BACKGROUND OF THE INVENTION

Many products have bodies or housings with hollow cavities therein. As only some examples, automobiles, trucks, and other motor vehicles, as well as some consumer appliances, have hollow cavities formed between inner and outer panels, in pillars, or within their frame members, that form their respective bodies or housings.

In particular, some structural members of automobile bodies have a variety of orifices, hollow posts, cavities, passages, and openings (collectively, "hollow cavities"). Hollow cavities are often created in these products to reduce overall weight of the final product, as well as to reduce material costs. However, introduction of hollow cavities is often not without tradeoffs. For example, introducing a hollow cavity may reduce the overall strength or energy-absorbing characteristics of a structural member. In addition, a hollow cavity may result in increased transmission of vibration or sound to other portions of the product.

It is known to use structural reinforcers to attempt to offset these and other tradeoffs. Some current reinforcers include an expansible material applied to a carrier, which typically is a molded component. The expansible material is expanded during the manufacture of the product, securing the reinforcer in place as the expanded material contacts the adjoining surface of the product. However, the expansible material in such reinforcers may not be securely joined to the carrier, leading to uneven or inadequate sealing. Moreover, expansion of the material may exacerbate the accumulation of fluids in the hollow cavity during production or ultimate use of the product, leading to corrosion or other undesirable effects.

Thus, a significant need remains for an improved structural reinforcer that alleviates these and other drawbacks.

BRIEF DESCRIPTION OF THE DRAWINGS

The present invention will now be described, by way of example, with reference to the accompanying drawings, in which.

Figure 1:
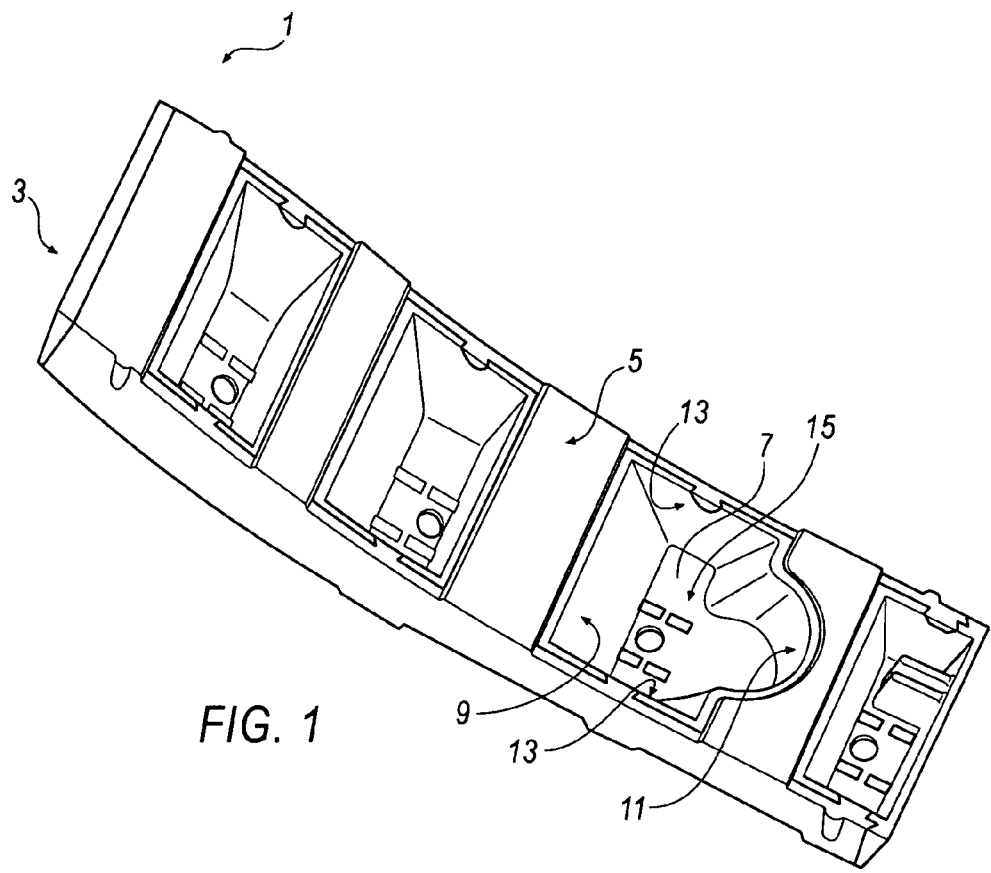
FIG. 1 is an angled top perspective of a structural reinforcer according to one embodiment.

Other aspects of the invention will be apparent to those skilled in the art after reviewing the drawings and the detailed description below.

DETAILED DESCRIPTION

Without limiting the invention to only embodiments described herein, some embodiments comprise an improved structural reinforcer with expansible material disposed on a carrier. The carrier is comprised of a plurality of chambers, each chamber formed from front, rear, side, and connecting walls and open on one top side or bottom side. A plurality of the connecting walls further comprise a drain hole that opens from the interior of the respective chamber into the environment external to the structural reinforcer, permitting drainage of fluids from the chamber. A plurality of connecting walls also comprise locking slots and shutoffs which mechanically lock a portion of the expansible material to the carrier. The shutoffs also define a channel on the bottom exterior of the structural reinforcer, permitting the flow of liquids within the structural member in which the structural reinforcer is disposed. When the structural reinforcer is disposed within a structural member and the expansible material is activated, the material expands and secures the reinforcer within the structural member.

Without limitation, some embodiments comprise a carrier with at least one wall forming an external plane on the carrier. A plurality of locking ports extends through the wall from the interior of the carrier to the external environment, and a plurality of shutoffs extends outwardly from the external plane, each shutoff having a lip that extends laterally towards the respective side of the carrier. An expansible material is disposed on at least a portion of the external plane, and the expansible material is entrained in the locking ports and shutoffs and expands when activated to contact a surface within the cavity of a structural member in which the structural reinforcer is disposed. Optionally the wall has at least one drain hole formed between a plurality of shutoffs, the drain hole extending from the interior of the carrier into the environment external to the structural reinforcer and permitting drainage of fluids from the interior of the chamber.

As shown in the embodiment of FIGS. 1-4, a structural reinforcer 1 is comprised of a carrier 3 on which an expansible material 5 is disposed. The carrier 3 is comprised of a plurality of chambers 7 that are arranged consecutively along the longitudinal axis of the carrier. Each chamber 7 is defined by a front wall 9, a rear wall 11, two side walls 13, and a connecting wall 15 which connects the front wall 9 and the rear wall 11, with one top side or bottom side of the respective chamber 7 opening to the exterior. The front wall 9 of a chamber 7 is configured relative to the rear wall 11 at any angle, although an angle that is not parallel is preferred. In such an embodiment, the configuration of longitudinally arranged chambers comprising front, rear, and connecting walls and opening on one top or bottom side provides energy-absorbing characteristics to the reinforcer, for example, absorbing force from a front-on crash impact in a motor vehicle collision.

Figure 2:
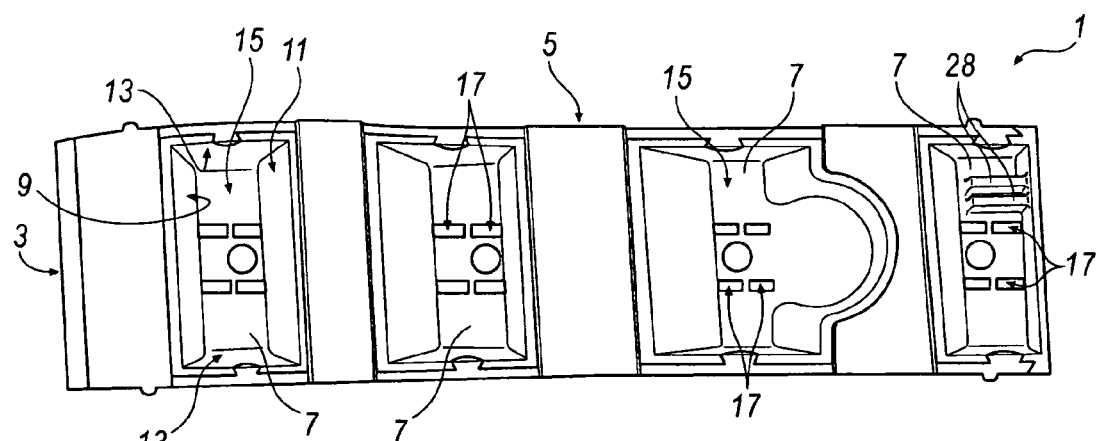
FIG. 2 is a top view of a structural reinforcer according to one embodiment.
Figure 3:
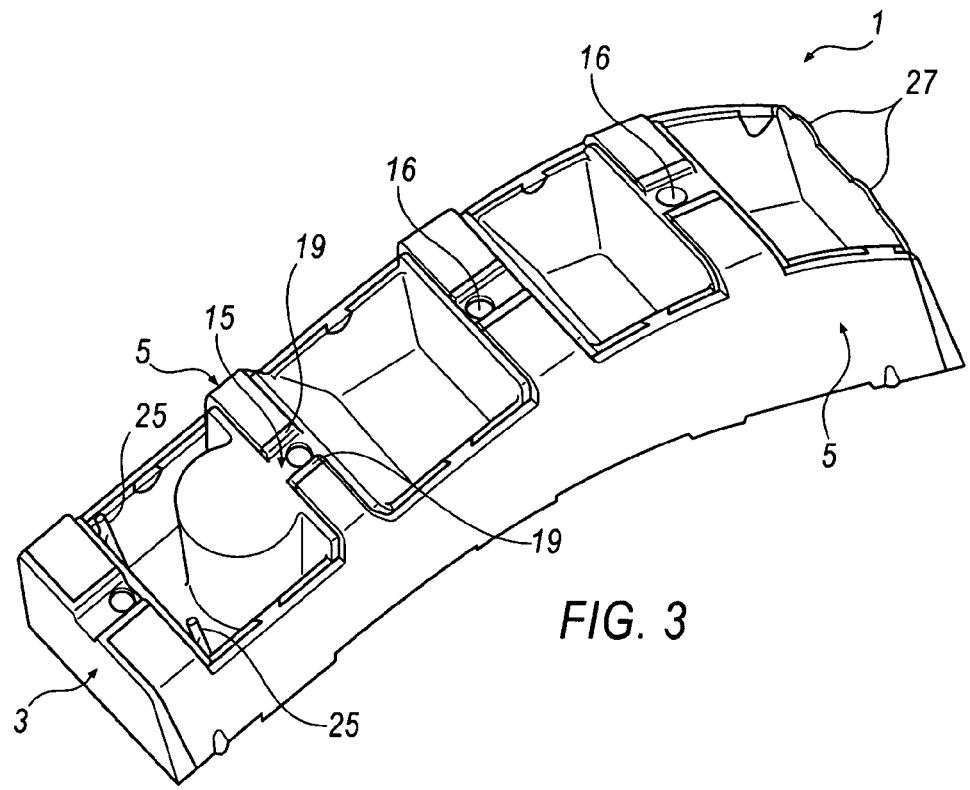
FIG. 3 is an angled bottom perspective of a structural reinforcer according to one embodiment.
Figure 4:
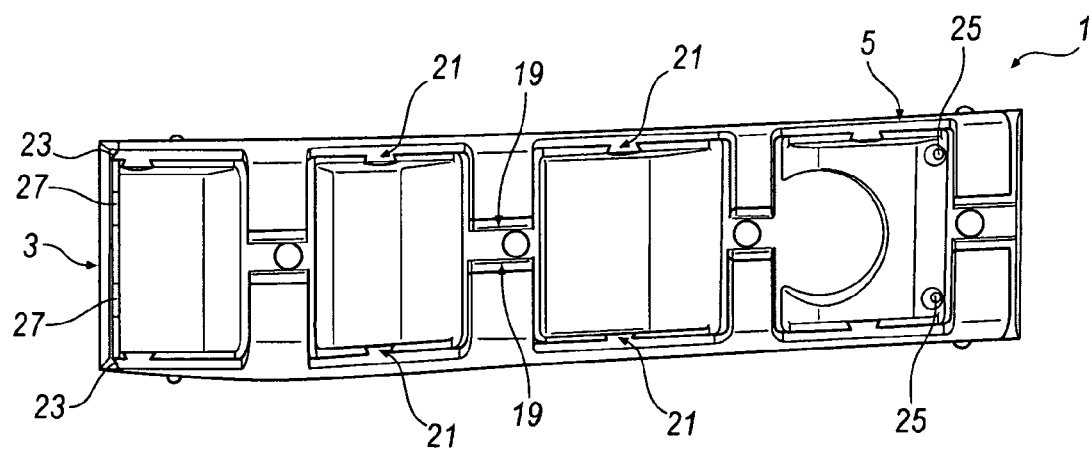
FIG. 4 is a bottom view of a structural reinforcer according to one embodiment.
Figure 5:
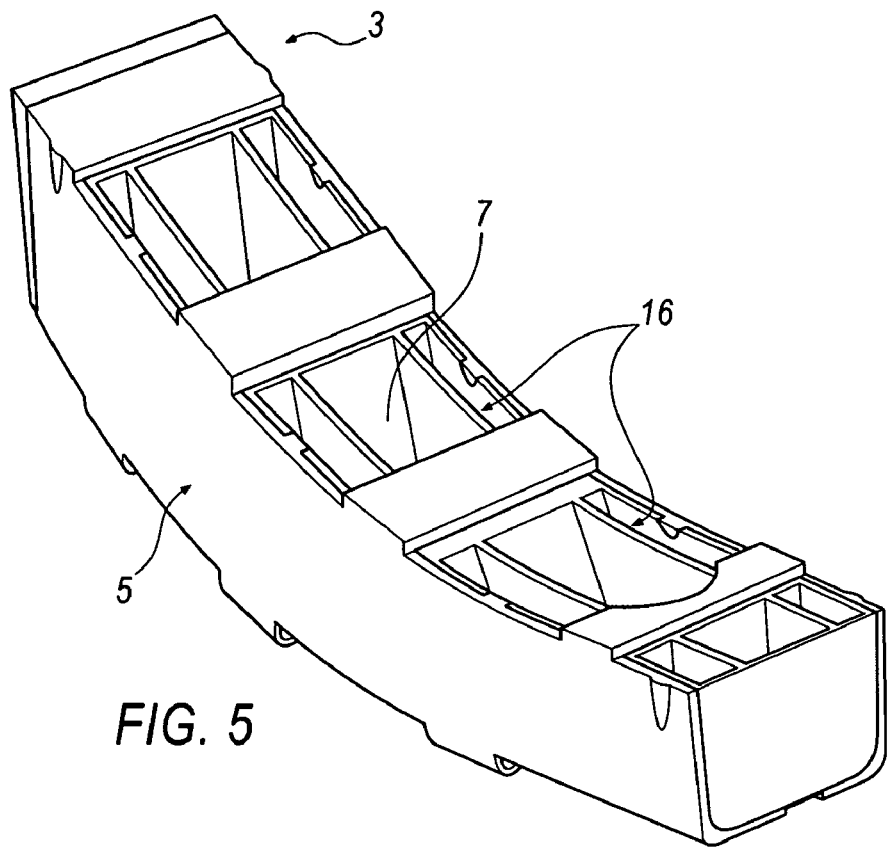
FIG. 5 is an angled top perspective of a structural reinforcer according to one embodiment.
Figure 6:
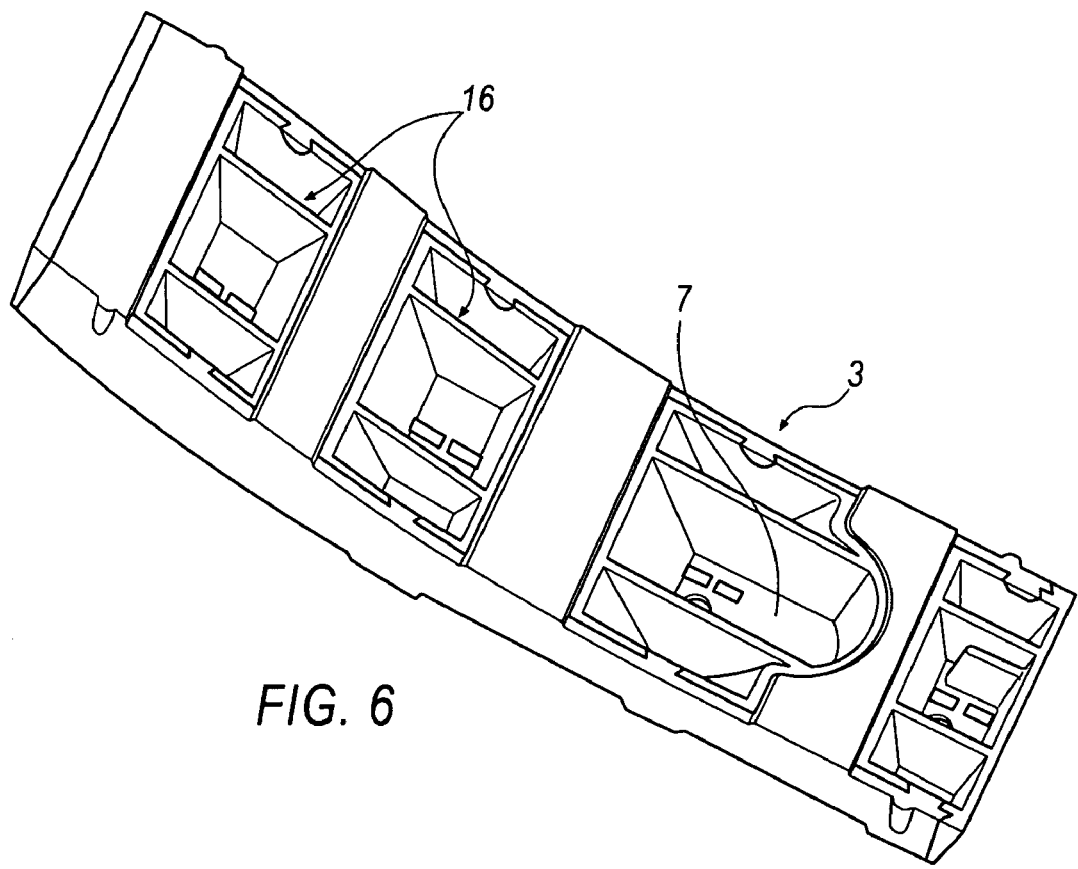
FIG. 6 is an angled top perspective of a structural reinforcer according to one embodiment.
Figure 7:
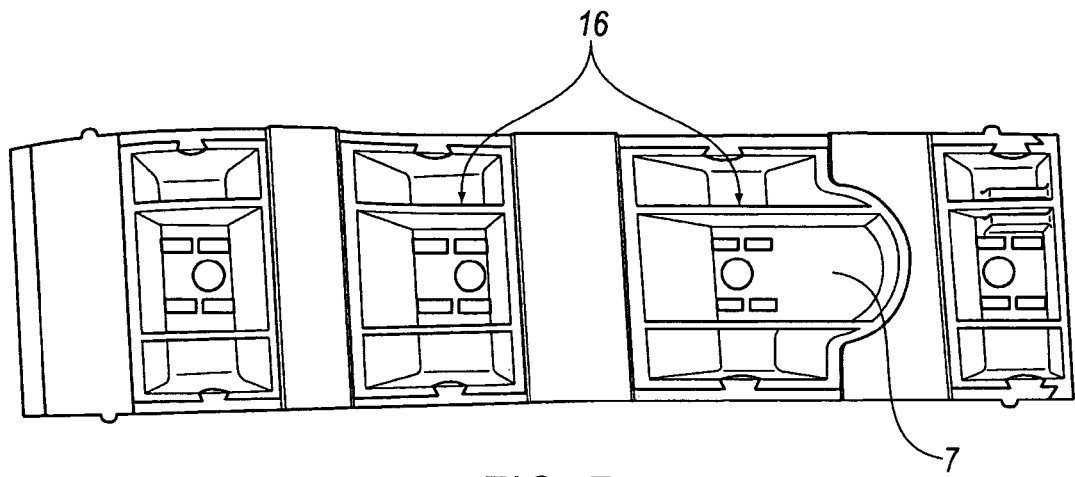
FIG. 7 is a top perspective of a structural reinforcer according to one embodiment.
Figure 8:
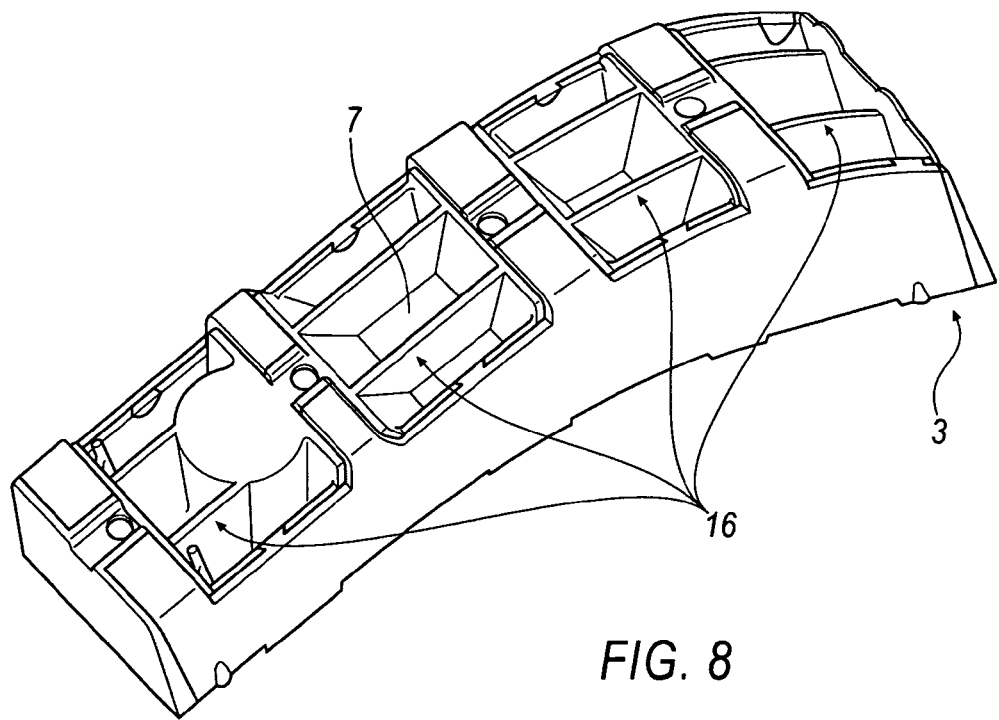
FIG. 8 is an angled bottom perspective of a structural reinforcer according to one embodiment.
Figure 9:
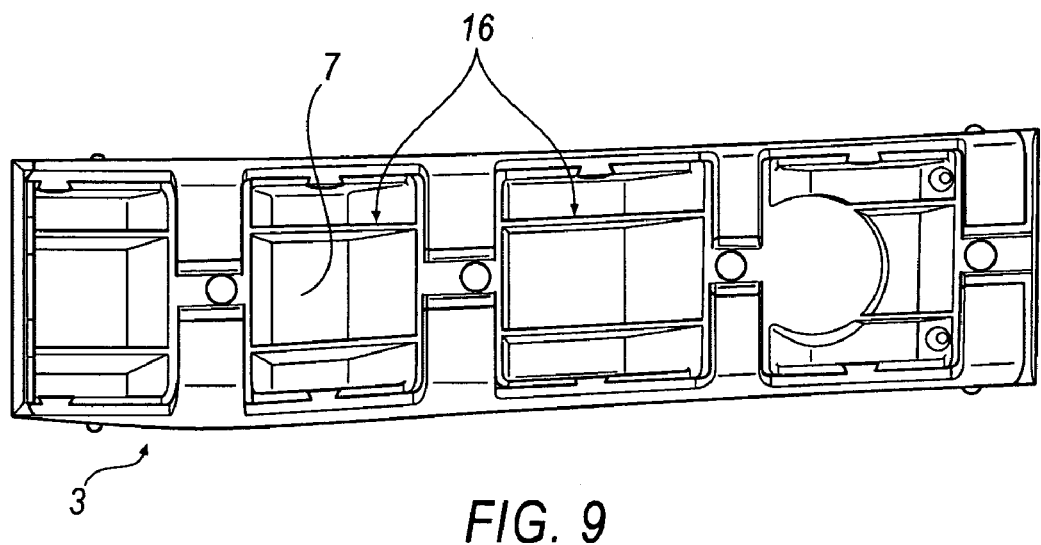
FIG. 9 is a bottom perspective of a structural reinforcer according to one embodiment.
Figure 11:
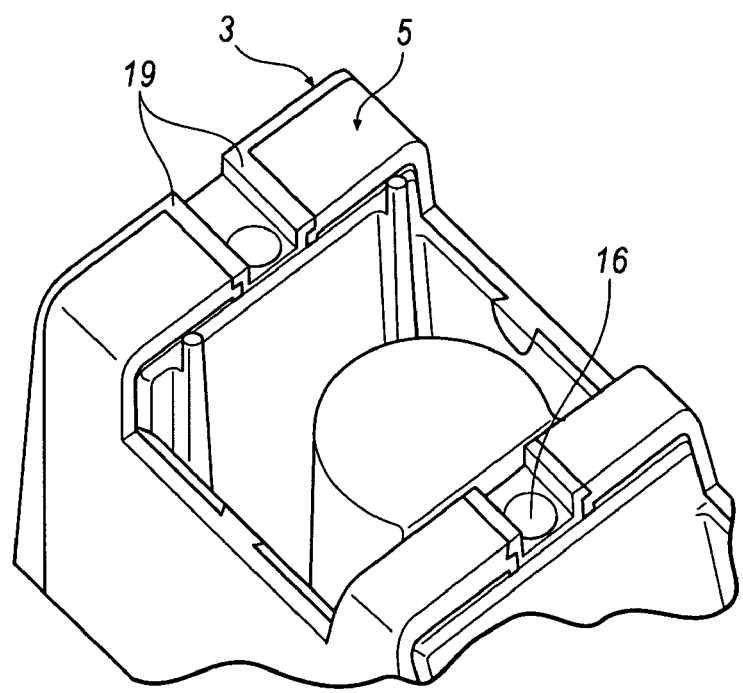
FIG. 11 is a detail view of shutoffs and drain holes of a structural reinforcer according to one embodiment.

As shown in an exemplary embodiment in FIGS. 2-4, a plurality of bottom connecting walls 15 further comprise two or more locking slots 17 that extend from the interior of the respective chamber 7 through the connecting wall 15 to the exterior environment. Such connecting walls 15 further comprise two or more shutoffs 19 extending outwardly from the exterior surface of the connecting wall 15, each shutoff 19 having a lip that extends laterally towards the side of the carrier 3 (FIG. 11). Some connecting walls 15 include a drain hole 16 that opens from the interior of the respective chamber 7 into the environment external to the structural reinforcer 1, permitting drainage of fluids from the chamber.

In some embodiments, without limitation, the carrier 3 further comprises one or more longitudinal ribs 16 disposed in one or more chambers 7 (e.g., FIGS. 5 through 9). The one or more longitudinal ribs connect with the front wall 9 and rear wall 11 of the chamber 7 and add additional force—absorbing characteristics to the carrier 3.

In some embodiments, without limitation (e.g., FIG. 4), the side walls 13 of one or more chambers 7 contain cutouts 21 which accept expansible material during the molding process. Similarly, a front wall 9 and/or rear wall 11 of one or more chambers 7 may extend laterally past the side walls 13 and comprise grooves 23 which also receive expansible material 5 during the molding process.

Figure 10:
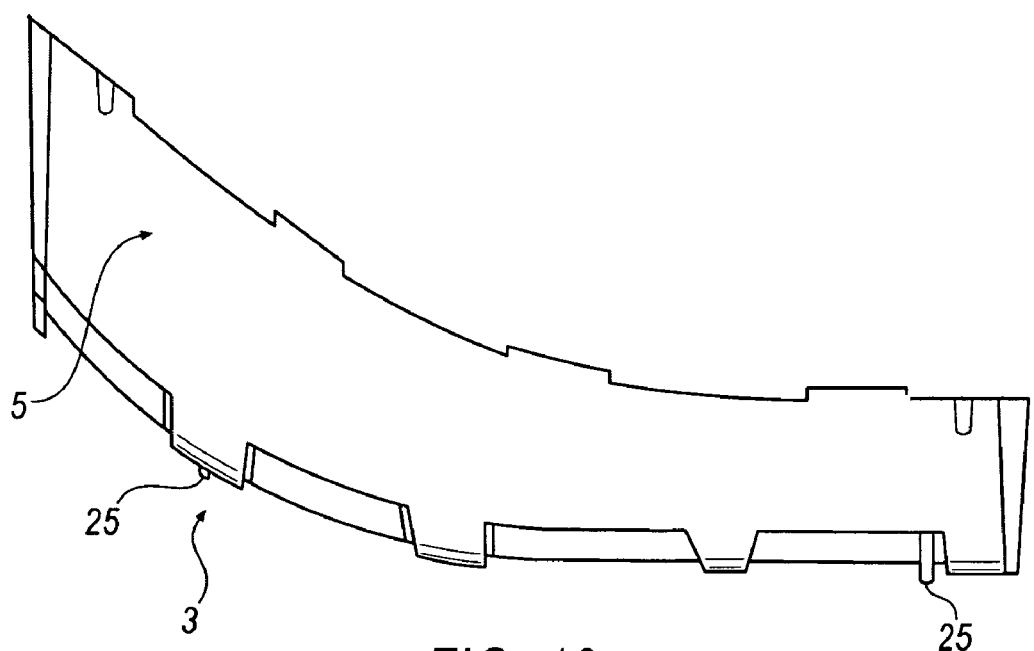
FIG. 10 is a side view of a structural reinforcer according to one embodiment.

In some embodiments, a front wall 9 and/or rear wall 11 of the carrier 3 includes posts 25 which dispose the reinforcer 1 away from an inner surface of the structural member when the reinforcer 1 is inserted into position (FIG. 3). Optionally the carrier 3 may also have posts 25, positioning tabs 27 and/or other features that accommodate the positioning of the carrier in conjunction with features of the structural member. (Id.; also, FIGS. 8, 10) The posts 25 and positioning tabs 27 dispose the reinforcer 1 from the adjoining surface of the structural member in order to accommodate the subsequent expansion of the expansible material 5 upon activation. In other embodiments, without limitation, the posts and/or positioning tabs may be reduced in number or omitted entirely. Optionally the carrier may contain other features that facilitate the assembly process (as one example only, ribs 28 that interact with a plunger sensor (not shown) during the assembly process to detect correct part placement)(e.g., FIG. 2).

The expansible material 5 can be any suitable material that expands upon being activated. In some embodiments, without limitation, the expansible material 5 is molded onto the carrier 3 as semi-rigid component adapted to fit predetermined areas on the carrier 3 and may be disposed on any surface of the carrier 3. The expansible material may be disposed on the carrier at any location and to any extent selected by the user. In some preferred embodiments, the expansible material 5 is disposed on at least a portion of the exterior surface of the side walls 13 and the connecting walls 15 so that the material 5 contacts the adjoining surfaces of the structural member when activated. In some embodiments without limitation, the expansible material may be disposed on essentially all of the side walls (e.g., FIG. 10).

Each reinforcer 1 is designed in shape and size to fit a particular cavity having a similar shape and size within a structural member. The size and design of the carrier 3 is generally dictated by size and shape of the cavity of the structural member into which the reinforcer 1 is to be inserted. For example, in the embodiment of FIG. 2, a portion of the carrier 3 is arcuate in order to generally fit the hollow cavity of a front frame rail, a structural member of a motor vehicle. The carrier 3 is generally adapted to fill the majority of the cavity, while the expansible material 5 is adapted to expand and seal the interface between the carrier 3 and the adjoining edges of the structural member that define the cavity.

As one example only, in a motor vehicle application, the carrier 36 is preferably formed as a unitary piece of a moldable material having a melting point that is higher than both the activation temperature of the expansible material 5 and the bake temperature to which the vehicle body and its structural members are to be exposed during manufacture. Preferably, the temperature at which the material of the carrier 3 softens is also above the bake temperature. Thus, the carrier 3 is able to substantially maintain its shape before, during and after the baking operation, so that the expansible material 5 expands to tightly fill a portion of the structural member, as some examples only, a pillar, rocker panel, or frame member.

The carrier 3 may be made of a variety of conventional materials, with the only main consideration being the activation conditions for the expansible material 5. The shape of the carrier 3 should remain substantially unchanged in response to the stimulus used to activate the expansible material 5. When using a heat-activated material, the carrier should not melt at temperatures used in the chosen heat source. For one example only, one common method of activating heat-activated materials is to allow the elevated temperatures applied to a motor vehicle during the coating and/or painting processes to cause the heat activated material to expand, thereby creating a seal within the cavity. When used in automotive structural members, the carrier 3 should be made of a material capable of withstanding the elevated temperatures associated with the coating, painting, and/or drying steps of the automobile manufacturing process, which is typically used to activate the heat expansible material.

While the carrier 3 can be made from a variety of materials (including metals), it is preferred that the carrier 3 is manufactured from plastic due to the reduced weight and lower force required to install the carrier into an opening. Nylon or a glass-based nylon is a preferred plastic material for manufacturing carriers 3. An exemplary material is a black, heat stabilized, lubricated 33% glass-reinforced 66-nylon having a heat deflection temperature at 1.8 MPa of 240 degrees C. (464 degrees F.), and a melting point of 262 degrees C. (504 degree F.). Such a material is marketed as NYLIND 51HSL BK001 by DuPont. However, other similar materials may be used depending upon the desired physical characteristics thereof.

The expansible material 5 is molded to the carrier 3 according to methods known to those of ordinary skill. Known methods of manufacture involve specifically molding the material 5 into a rigid component whose shape matches that of its corresponding desired position on carrier 3. In some embodiments, without limitation, the material 5 is applied to the carrier 3 in its pre-activation, flowable state and is molded to the carrier 3 during manufacture of the reinforcer 1. The material 5 is applied to the carrier 3 by injecting and/or pressing the material into a mold (not shown) containing the pre-formed carrier 3. For each carrier shape or design, a set of corresponding molds for the expansible material 5 must be created. A preselected thickness of expansible material 5 is molded over the carrier 3 at predetermined locations. The original thickness and other properties of the expansible material 5, such as coefficient of expansion and baking temperature, are determined according to methods known to those of ordinary skill in order to provide a desired thickness after expansion of material 5.

Figure 12:
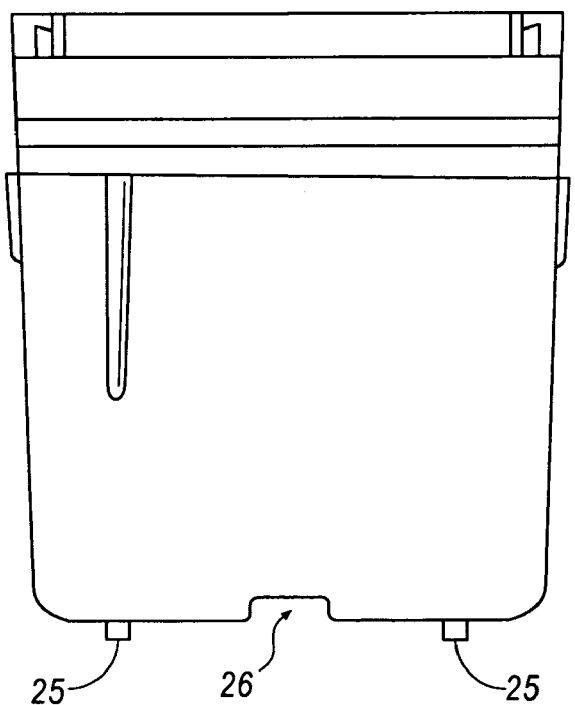
FIG. 12 is an end view of a structural reinforcer according to one embodiment, showing a drain channel.

When applied to the carrier 3 during the molding process, the expansible material 5 is directed by the production mold so that a portion of the material 5 flows into the locking slots 17 and underneath the lips of the shutoffs 19. As the material solidifies, it becomes entrained in the slots 17 and underneath the lips of the shutoffs 19, thereby mechanically locking the material 5 to the carrier 3 without additional tooling features on the carrier 3 or the mold tooling (not shown). The shutoffs 19 also prevent the material 5 from flowing laterally toward the center of the connecting wall 15, thus creating a longitudinal channel 26 (e.g., FIG. 12) along the exterior of the connecting wall 15 and preventing blockage of the drain hole 16 by expansible material 5. Similarly, during the molding process, expansible material is directed into the cutouts 21 in side walls 13 and grooves 23 in the laterally extending sides of front 9 and/or rear walls 11 so that the material 5 is captured by the cutouts 21 and grooves 23, further locking the material in place on the carrier. In this way, a drainage channel 26 is formed that permits fluids to drain out of the structural member while also allowing for bonding on desired cavity surfaces.

Without limiting the possible embodiments, the expansible material 5 may be any suitable thermally expansible material. Such materials are known to those of ordinary skill in the art for structural reinforcement purposes and for other purposes, including without limitation, sound deadening (baffling) purposes. When used in an automotive application, one necessary characteristic of the expansible material 5 is that it should possess an activation temperature lower than or equal to the temperature at which the automobile body is baked during manufacture. For example, it is conventional to employ a bake temperature of about 177 degrees C. (350 degrees F.) in the manufacture of automobiles. Accordingly, a preferred expansible material for use in the manufacture of automobiles should possess an activation temperature lower than this value, e.g. 149 degrees C. (300 degrees F.).

Expansible material 5 can comprise a variety of expansible materials, but it is preferably one that expands upon activation, such as in response to a change in temperature or an introduction of a chemical compound. In one embodiment, without limitation, the expansible material is a heat-expansible foaming material; however, any material that expands upon activation and that is flowable prior to being molded is a suitable expansible material. That is, prior to being expanded, the expansible material 5 should have a viscosity that is sufficiently low to allow the material to flow into a mold and allow the expansible material 5 to take on various shapes defined by the carrier 3. In some embodiments, the viscosity of the pre-activation expansible material 5 should be sufficiently high such that the expansible material remains essentially stationary once it is applied to the carrier 3. In some embodiments, the expansible material 5 is formed of a dry, initially non-tacky material that becomes tacky upon expansion so that the expansible material 5 adheres to the structural member when the structural reinforcer 1 is heated to the activation temperature at which the expansible material 5 expands.

Any expansible material may be employed provided that it is able to expand sufficiently upon activation to seal the hollow cavity of the structural member within which the structural reinforcer 1 is positioned. As some examples only, a series of suitable expansible reinforcer materials are described in the U.S. Pat. No. 6,387,470, incorporated herein by reference in its entirety. Such material is marketed by Sika Corporation of Lyndhurst, N.J. A preferred expansible material is commercially available from Sika Corporation under the mark SikaReinforcer®.

By way of one example only, without limitation, expansible materials 5 can provide structural reinforcement to structural members in motor vehicles. A structural reinforcer 1 comprised of a carrier 3 upon which an expansible material 3 is disposed can be placed within the cavity of an automotive structural member such as a frame rail, pillar, or other member. Then, the expansible material 5 is heated to an activation temperature, where it expands. Upon expansion, the material 5 adheres to at least a portion of the adjacent surface of the structural member. Thus, the structural reinforcer 1 provides reinforcement for the structural member such that the member is less easily bent, compressed or otherwise deformed.

Figure 13:
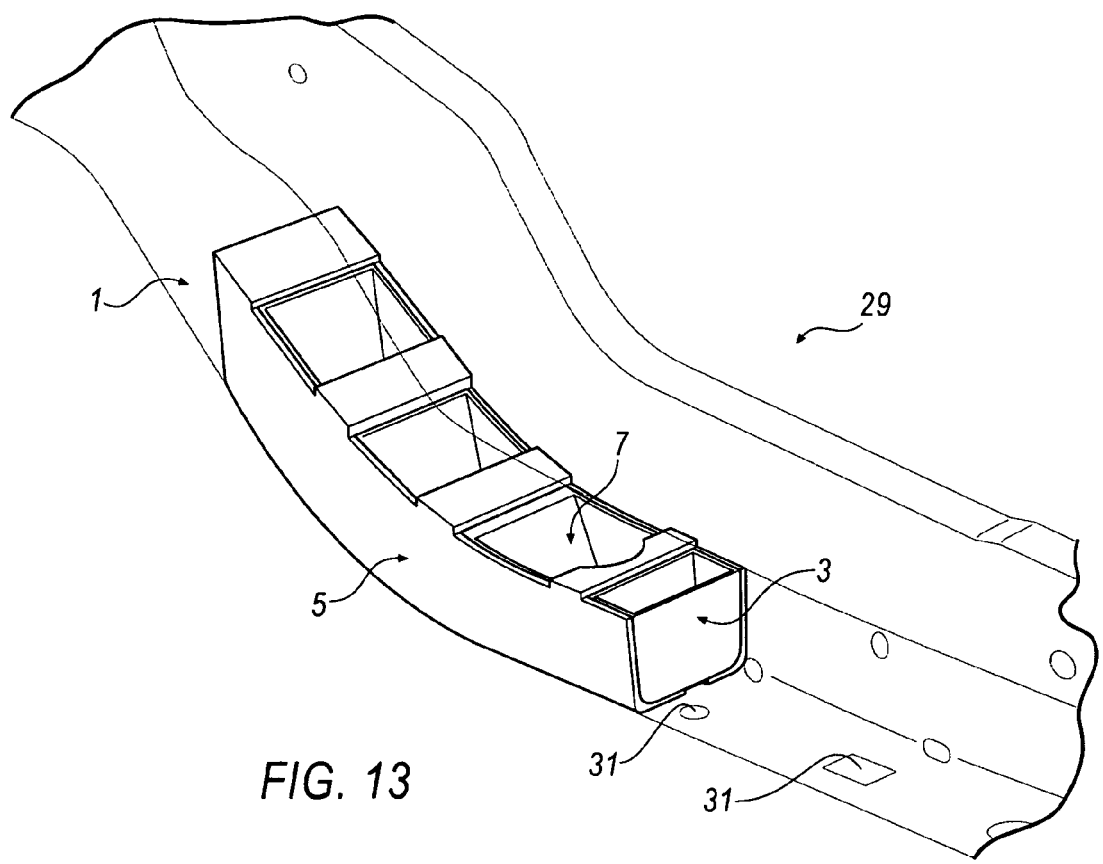
FIG. 13 is a diagram of a reinforced structural member of a motor vehicle showing the installation of a structural reinforcer according to one embodiment.

Without limiting the invention to only disclosed embodiments, FIG. 13 shows an exemplary embodiment comprising a structural member of a motor vehicle. A structural reinforcer 1 according to some embodiments is disposed within a structural member 29 of a motor vehicle, here a front frame rail in the front kickup area, and remains there during subsequent assembly. The reinforcer 1 is comprised of a carrier 3 with an expansible material 5 molded to it, along with locking ports and shutoffs (not shown) locking the material to the carrier. During the manufacturing process, the frame rail 29 containing the installed reinforcer 1 is submerged in a bath of electro-coating solution. Excess solution drains from the chamber 7 through the drain hole 16 (not shown) and along the frame rail, exiting via cutouts 31 in the frame. The drain channel 26 formed by the shutouts (not shown) allows drainage of fluids along the frame rail. The frame rail 29 is then placed in a heating oven, where the electro-coating solution is baked onto the frame, typically of about 177° C. (approximately 350° F.). During the baking process, the expansible material 5 is activated, expands, and secures the structural reinforcer 1 in place within the structural member 29. Although the structural reinforcer 1 is described in this example in the context of a motor vehicle, it is understood that it can also be used in connection with a variety of other articles of manufacture to reinforce their structural members.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

What is claimed is:

1. A structural reinforcer adapted for positioning within the cavity of a structural member, comprising:
   a carrier with a plurality of chambers aligned along its longitudinal axis, each chamber defined by a front wall, a rear wall, side walls, and a connecting wall connecting the front wall and the rear wall, and
   an expansible material disposed on at least a portion of the carrier,
   wherein the expansible material expands when activated to contact a surface within the cavity of a structural member.

2. The structural reinforcer of claim 1, wherein the connecting wall of at least one chamber further comprises a plurality of locking ports extending through the connecting wall and a plurality of shutoffs extending from the exterior of the connecting wall, and wherein the expansible material is disposed on at least a portion of the carrier such that the material is entrained in said locking ports and said shut-offs.

3. The structural reinforcer of claim 1, wherein the connecting wall of at least one chamber further comprises a drain hole, a plurality of locking ports extending through the connecting wall, and a plurality of shutoffs extending from and defining a channel along the exterior of the connecting wall, and wherein the expansible material is disposed on at least a portion of the carrier such that the material is entrained in said locking ports and said shut-offs without blocking the drain hole.

4. The structural reinforcer of claim 1, further comprising one or more longitudinal ribs disposed in one or more chambers of the carrier.

5. The structural reinforcer of claim 1, 2, 3, or 4, further comprising one or more cutouts disposed in the side wall of the carrier, wherein expansible material is captured in one or more of the cutouts.

6. The structural reinforcer of claim 1, 2, 3, or 4, wherein the structural member is a pillar, a panel, or a frame rail of a motor vehicle.

7. A structural reinforcer adapted for positioning within the cavity of a structural member, comprising:
   a carrier with a plurality of chambers aligned along its longitudinal axis, each chamber defined by a front wall, a rear wall, side walls, and a connecting wall connecting the front wall and the rear wall,
   an expansible material disposed on at least a portion of the carrier, and
   means to mechanically lock the expansible material to the carrier,
   wherein the expansible material expands when activated to contact a surface within the cavity of a structural member.

8. The structural reinforcer of claim 7, wherein the means comprises a plurality of locking ports extending through at least one connecting wall.

9. The structural reinforcer of claim 8, wherein the means further comprises a plurality of shutoffs extending from the exterior of at least one connecting wall.

10. The structural reinforcer of claim 9, wherein at least one connecting wall further comprises a drain hole and a plurality of shutoffs defining a channel along the exterior of said at least one connecting wall.

11. The structural reinforcer of claim 7, further comprising one or more longitudinal ribs disposed in one or more chambers of the carrier.

12. The structural reinforcer of claim 9, wherein the means further comprises one or more cutouts disposed in the side wall of the carrier.

13. A reinforced structural member of a motor vehicle, comprising:
   a structural member of a motor vehicle comprising a cavity therein, and
   a structural reinforcer disposed within the cavity of the structural member, the structural reinforcer comprised of:
   a carrier with a plurality of chambers aligned along its longitudinal axis, each chamber defined by a front wall, a rear wall, side walls, and a connecting wall connecting the front wall and the rear wall, and
   an expansible material disposed on at least a portion of the carrier,
   wherein the expansible material expands when activated to contact a surface within the cavity of a structural member.

14. The reinforced structural member of claim 13, wherein the connecting wall of at least one chamber further comprises a plurality of locking ports extending through the connecting wall and a plurality of shutoffs extending from the exterior of the connecting wall, and wherein the expansible material is disposed on at least a portion of the carrier such that the material is entrained in said locking ports and said shut-offs.

15. The reinforced structural member of claim 13, wherein the connecting wall of at least one chamber further comprises a drain hole, a plurality of locking ports extending through the connecting wall, and a plurality of shutoffs extending from and defining a channel along the exterior of the connecting wall, and wherein the expansible material is disposed on at least a portion of the carrier such that the material is entrained in said locking ports and said shut-offs without blocking the drain hole.

16. The reinforced structural member of claim 13, further comprising one or more longitudinal ribs disposed in one or more chambers of the carrier.

17. The reinforced structural member of claim 13, 14, 15, or 16, further comprising one or more cutouts disposed in the side wall of the carrier, wherein expansible material is captured in one or more of the cutouts.

18. The reinforced structural member of claim 13, 14, 15, or 16, wherein the structural member is a pillar, a panel, or a frame rail of a motor vehicle.

19. A reinforced structural member of a motor vehicle, comprising:
   a structural member of a motor vehicle comprising a cavity therein, and
   a structural reinforcer disposed within the cavity of the structural member, the structural reinforcer comprised of:
   a carrier with a plurality of chambers aligned along its longitudinal axis, each chamber defined by a front wall, a rear wall, side walls, and a connecting wall connecting the front wall and the rear wall,
   an expansible material disposed on at least a portion of the carrier, and
   means to mechanically lock the expansible material to the carrier,
   wherein the expansible material expands when activated to contact a surface within the cavity of a structural member.

20. The reinforced structural member of claim 19, wherein the means comprises a plurality of locking ports extending through at least one connecting wall.

21. The reinforced structural member of claim 20, wherein the means further comprises a plurality of shutoffs extending from the exterior of at least one connecting wall.

22. The reinforced structural member of claim 21, wherein at least one connecting wall further comprises a drain hole and a plurality of shutoffs defining a channel along the exterior of said at least one connecting wall.

23. The reinforced structural member of claim 19, further comprising one or more longitudinal ribs disposed in one or more chambers of the carrier.

24. The reinforced structural member of claim 21, wherein the means further comprising one or more cutouts disposed in the side wall of the carrier.

25. A structural reinforcer adapted for positioning within the cavity of a structural member, comprising:
   a carrier with at least one wall forming an external plane on the carrier,
   a plurality of locking ports extending through the wall,
   a plurality of shutoffs extending from the external plane, and
   an expansible material disposed on at least a portion of the external plane, wherein the expansible material is entrained in said locking ports and said shut-offs and expands when activated to contact a surface within the cavity of a structural member.

26. The structural reinforcer of claim 25, wherein the wall further comprises at least one drain hole, the plurality of shutoffs further defines a channel along the exterior of the wall, and the expansible material is entrained in said locking ports and said shut-offs without blocking the drain hole.

27. The structural reinforcer of claim 25, further comprising one or more longitudinal ribs disposed in one or more chambers of the carrier.

28. The structural reinforcer of claim 25, 26, or 27, further comprising one or more cutouts disposed in the side wall of the carrier.

29. The structural reinforcer of claim 25, 26, or 27, wherein the structural member is a pillar, a panel, or a frame rail of a motor vehicle.

30. A reinforced structural member of a motor vehicle, comprising:
- a structural member of a motor vehicle comprising a cavity therein, and
- a structural reinforcer disposed within the cavity of the structural member, the structural reinforcer comprised of:
- a carrier with at least one wall forming an external plane on the carrier,
- a plurality of locking ports extending through the wall,
- a plurality of shutoffs extending from the external plane, and
- an expansible material disposed on at least a portion of the external plane,
- wherein the expansible material is entrained in said locking ports and said shut-offs and expands when activated to contact a surface within the cavity of a structural member.

31. The reinforced structural member of claim 30, wherein the wall further comprises at least one drain hole, the plurality of shutoffs further defines a channel along the exterior of the wall, and the expansible material is entrained in said locking ports and said shut-offs without blocking the drain hole.

32. The reinforced structural member of claim 30, further comprising one or more longitudinal ribs disposed in one or more chambers of the carrier.

33. The reinforced structural member of claim 30, 31, or 32, further comprising one or more cutouts disposed in the side wall of the carrier.

34. The reinforced structural member of claim 30, 31, or 32, wherein the structural member is a pillar, a panel, or a frame rail of a motor vehicle.

* * * * *